(12) United States Patent
Esselink et al.

(10) Patent No.: US 10,097,993 B2
(45) Date of Patent: Oct. 9, 2018

(54) METHOD AND APPARATUS FOR REMOTE AUTHENTICATION

(75) Inventors: Chad Evert Esselink, Canton, MI (US); Michael Raymond Westra, Plymouth, MI (US); Mark Schunder, South Lyon, MI (US); David Chase Mitchell, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1183 days.

(21) Appl. No.: 13/189,722

(22) Filed: Jul. 25, 2011

(65) Prior Publication Data

US 2013/0031604 A1 Jan. 31, 2013

(51) Int. Cl.
G06F 21/00 (2013.01)
H04W 12/06 (2009.01)
H04L 29/08 (2006.01)
G06F 21/62 (2013.01)

(52) U.S. Cl.
CPC ........ *H04W 12/06* (2013.01); *G06F 21/6218* (2013.01); *H04L 67/12* (2013.01)

(58) Field of Classification Search
CPC ..... H04W 12/06; H04L 67/12; G06F 21/6218
USPC ............................................. 726/2–8, 26–30
See application file for complete search history.

(56) References Cited

U.S. PATENT DOCUMENTS

| 5,467,070 A | 11/1995 | Drori et al. |
| 5,513,107 A | 4/1996 | Gormley |
| 5,627,510 A | 5/1997 | Yuan |
| 5,635,916 A | 6/1997 | Bucholtz et al. |
| 5,655,081 A | 8/1997 | Bonnell et al. |

(Continued)

FOREIGN PATENT DOCUMENTS

| CN | 1863052 | 11/2006 |
| CN | 101596895 A | 12/2009 |

(Continued)

OTHER PUBLICATIONS

Autobiometrics, COM, US Distributor for ATRD Biometric Immobilizer, http://www.autobiometrics.com, Jul. 6, 2011.

(Continued)

*Primary Examiner* — Linglan E Edwards
(74) *Attorney, Agent, or Firm* — Jennifer Stec; Brooks Kushman P.C.

(57) ABSTRACT

A computer-implemented authentication method includes receiving a request to access one or more features of a vehicle computing system (VCS) from an application running on a wireless device in communication with the VCS. The method further includes preparing a secure access rights request to a remote server including one or more characteristics associated with the application and sending the secure request from the VCS, through the wireless device to the remote server. The method additionally includes receiving a response to the request having been sent from the remote server through the wireless device. The method includes verifying the authenticity of the received response and updating a policy table including information from the received response, the information including at least an expiration trigger and access rights for the application. Also, the method includes validating the application for usage based at least on the information included in the updated policy table.

6 Claims, 7 Drawing Sheets

(56) References Cited

U.S. PATENT DOCUMENTS

| | | |
|---|---|---|
| 5,734,336 A | 3/1998 | Smithline |
| 5,776,031 A | 7/1998 | Minowa et al. |
| 5,828,319 A | 10/1998 | Tonkin et al. |
| 6,018,291 A | 1/2000 | Marble et al. |
| 6,177,866 B1 | 1/2001 | O'Connell |
| 6,198,996 B1 | 3/2001 | Berstis |
| 6,263,282 B1 | 7/2001 | Vallancourt |
| 6,268,804 B1 | 7/2001 | Janky et al. |
| 6,271,745 B1 | 8/2001 | Anzai et al. |
| 6,434,455 B1 | 8/2002 | Snow et al. |
| 6,434,486 B1 | 8/2002 | Studt et al. |
| 6,438,491 B1 | 8/2002 | Farmer |
| 6,439,078 B1 | 8/2002 | Schlude et al. |
| 6,574,734 B1 | 6/2003 | Colson et al. |
| 6,590,495 B1 | 7/2003 | Behbehani |
| 6,668,221 B2 | 12/2003 | Harter, Jr. et al. |
| 6,679,702 B1 | 1/2004 | Rau |
| 6,690,260 B1 | 2/2004 | Ashihara |
| 6,737,963 B2 | 5/2004 | Gutta et al. |
| 6,754,562 B2 | 6/2004 | Strege et al. |
| 6,785,542 B1 | 8/2004 | Blight et al. |
| 6,810,309 B2 | 10/2004 | Sadler et al. |
| 6,853,919 B2 | 2/2005 | Kellum |
| 6,859,718 B2 | 2/2005 | Fritz et al. |
| 6,871,145 B2 | 3/2005 | Altan et al. |
| 6,906,619 B2 | 6/2005 | Williams et al. |
| 6,941,194 B1 | 9/2005 | Dauner et al. |
| 7,057,501 B1 | 6/2006 | Davis |
| 7,075,409 B2 | 7/2006 | Guba |
| 7,102,496 B1 | 9/2006 | Ernst, Jr. et al. |
| 7,124,027 B1 | 10/2006 | Ernst, Jr. et al. |
| 7,148,790 B2 | 12/2006 | Aoyama et al. |
| 7,161,563 B2 | 1/2007 | Vitale et al. |
| 7,194,069 B1 | 3/2007 | Jones et al. |
| 7,207,041 B2 | 4/2007 | Elson et al. |
| 7,228,213 B2 | 6/2007 | Sakai et al. |
| 7,246,062 B2 | 7/2007 | Knott et al. |
| 7,266,438 B2 | 9/2007 | Kellum et al. |
| 7,337,113 B2 | 2/2008 | Nakagawa et al. |
| 7,340,332 B2 | 3/2008 | Underdahl et al. |
| 7,356,394 B2 | 4/2008 | Burgess |
| 7,366,892 B2 | 4/2008 | Spaur et al. |
| 7,375,620 B2 | 5/2008 | Balbale et al. |
| 7,391,305 B2 | 6/2008 | Knoll et al. |
| 7,565,230 B2 | 7/2009 | Gardner et al. |
| 7,602,782 B2 | 10/2009 | Doviak et al. |
| 7,783,475 B2 | 8/2010 | Neuberger et al. |
| 7,812,712 B2 | 10/2010 | White et al. |
| 7,862,945 B2 | 1/2011 | Saito et al. |
| 8,050,817 B2 * | 11/2011 | Moinzadeh et al. ............ 701/36 |
| 8,089,339 B2 | 1/2012 | Mikan et al. |
| 8,232,864 B2 | 7/2012 | Kakiwaki |
| 8,237,554 B2 | 8/2012 | Miller et al. |
| 8,258,939 B2 | 9/2012 | Miller et al. |
| 8,301,108 B2 | 10/2012 | Naboulsi |
| 8,305,189 B2 | 11/2012 | Miller et al. |
| 8,311,722 B2 | 11/2012 | Zhang et al. |
| 2001/0021891 A1 | 9/2001 | Kusafuka et al. |
| 2002/0013650 A1 | 1/2002 | Kusafuka et al. |
| 2002/0031228 A1 | 3/2002 | Karkas et al. |
| 2002/0096572 A1 | 7/2002 | Chene et al. |
| 2002/0097145 A1 | 7/2002 | Tumey et al. |
| 2003/0004730 A1 | 1/2003 | Yuschik |
| 2003/0055643 A1 | 3/2003 | Woestemeyer et al. |
| 2003/0079123 A1 | 4/2003 | Mas Ribes |
| 2003/0217148 A1 * | 11/2003 | Mullen et al. ............... 709/225 |
| 2003/0220725 A1 | 11/2003 | Harter, Jr. et al. |
| 2003/0231550 A1 | 12/2003 | MacFarlane |
| 2004/0046452 A1 | 3/2004 | Suyama et al. |
| 2004/0073367 A1 | 4/2004 | Altan et al. |
| 2004/0088205 A1 | 5/2004 | Geisler et al. |
| 2004/0124968 A1 | 7/2004 | Inada et al. |
| 2004/0176906 A1 | 9/2004 | Matsubara et al. |
| 2004/0227642 A1 | 11/2004 | Giles et al. |
| 2004/0236475 A1 | 11/2004 | Chowdhary |
| 2005/0021597 A1 * | 1/2005 | Derasmo et al. ............. 709/201 |
| 2005/0125110 A1 | 6/2005 | Potter et al. |
| 2005/0134115 A1 | 6/2005 | Betts, Jr. et al. |
| 2005/0177635 A1 | 8/2005 | Schmidt et al. |
| 2005/0190039 A1 | 9/2005 | Aoyama |
| 2005/0193212 A1 | 9/2005 | Yuhara |
| 2005/0261816 A1 | 11/2005 | DiCroce et al. |
| 2006/0056663 A1 | 3/2006 | Call |
| 2006/0142917 A1 | 6/2006 | Goudy |
| 2006/0150197 A1 | 7/2006 | Werner |
| 2006/0156315 A1 | 7/2006 | Wood et al. |
| 2006/0220904 A1 | 10/2006 | Jarlengrip |
| 2006/0293813 A1 | 12/2006 | Nou |
| 2007/0027595 A1 | 2/2007 | Nou |
| 2007/0050854 A1 | 3/2007 | Cooperstein et al. |
| 2007/0072616 A1 | 3/2007 | Irani |
| 2007/0100514 A1 | 5/2007 | Park |
| 2007/0103339 A1 | 5/2007 | Maxwell et al. |
| 2007/0255568 A1 | 11/2007 | Pennock |
| 2008/0070616 A1 | 3/2008 | Yun |
| 2008/0109653 A1 * | 5/2008 | Yokohama .................... 713/156 |
| 2008/0148374 A1 | 6/2008 | Spaur et al. |
| 2008/0150683 A1 | 6/2008 | Mikan et al. |
| 2008/0275604 A1 | 11/2008 | Perry et al. |
| 2009/0030605 A1 | 1/2009 | Breed |
| 2009/0096596 A1 | 4/2009 | Sultan et al. |
| 2009/0167524 A1 | 7/2009 | Chesnutt et al. |
| 2009/0184800 A1 | 7/2009 | Harris |
| 2009/0195370 A1 | 8/2009 | Huffman et al. |
| 2009/0275281 A1 | 11/2009 | Rosen |
| 2009/0309709 A1 | 12/2009 | Bevacqua et al. |
| 2010/0004818 A1 | 1/2010 | Phelan |
| 2010/0007479 A1 | 1/2010 | Smith |
| 2010/0013596 A1 | 1/2010 | Kakiwaki |
| 2010/0039224 A1 | 2/2010 | Okude et al. |
| 2010/0075656 A1 | 3/2010 | Hawarter et al. |
| 2010/0097178 A1 | 4/2010 | Pisz et al. |
| 2010/0057586 A1 | 5/2010 | Chow |
| 2010/0148923 A1 | 6/2010 | Takizawa |
| 2010/0178872 A1 | 7/2010 | Alrabady et al. |
| 2010/0191535 A1 | 7/2010 | Berry et al. |
| 2010/0191973 A1 | 7/2010 | Huntzicker et al. |
| 2010/0030458 A1 | 12/2010 | Coughlin |
| 2010/0321203 A1 | 12/2010 | Tieman et al. |
| 2011/0009107 A1 | 1/2011 | Guba et al. |
| 2011/0071720 A1 | 3/2011 | Schondorf et al. |
| 2011/0071725 A1 | 3/2011 | Kleve et al. |
| 2011/0071734 A1 | 3/2011 | Van Wiemeersch et al. |
| 2011/0102146 A1 | 5/2011 | Giron |
| 2011/0105097 A1 * | 5/2011 | Tadayon et al. ............. 455/418 |
| 2011/0106374 A1 | 5/2011 | Margol et al. |
| 2011/0112969 A1 | 5/2011 | Zaid et al. |
| 2011/0148574 A1 | 7/2011 | Simon et al. |
| 2011/0166748 A1 | 7/2011 | Schneider et al. |
| 2011/0213629 A1 | 9/2011 | Clark et al. |
| 2011/0215921 A1 | 9/2011 | Ben Ayed et al. |
| 2011/0275321 A1 | 11/2011 | Zhou et al. |
| 2011/0295444 A1 | 12/2011 | Westra et al. |
| 2012/0041633 A1 | 2/2012 | Schunder et al. |
| 2012/0054036 A1 | 3/2012 | Nam et al. |
| 2012/0071140 A1 | 3/2012 | Oesterling et al. |
| 2012/0139760 A1 | 6/2012 | Bevacqua et al. |
| 2012/0157069 A1 | 6/2012 | Elliott et al. |
| 2012/0280786 A1 | 11/2012 | Miller et al. |
| 2012/0284702 A1 * | 11/2012 | Ganapathy et al. ......... 717/174 |
| 2012/0293317 A1 | 11/2012 | Hanna et al. |
| 2012/0313768 A1 | 12/2012 | Campbell et al. |
| 2013/0005302 A1 | 1/2013 | Ozaki |
| 2013/0162421 A1 | 6/2013 | Inaguma et al. |
| 2013/0200999 A1 | 8/2013 | Spodak et al. |

FOREIGN PATENT DOCUMENTS

| | | |
|---|---|---|
| DE | 102007046270 A1 | 4/2009 |
| JP | 2008195253 | 8/2008 |
| JP | 2008303630 | 12/2008 |
| WO | WO2001025572 A1 | 4/2001 |

(56) References Cited

FOREIGN PATENT DOCUMENTS

| WO | 2009158469 | 12/2009 |
|----|------------|---------|
| WO | 2012015403 | 2/2013  |

OTHER PUBLICATIONS

SALES@usasupremetech.com, In the U.S. a Car is Stolen Every 26 Seconds, The Wave of the Future, Biometrics Authentication, An Introduction.
Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.

\* cited by examiner

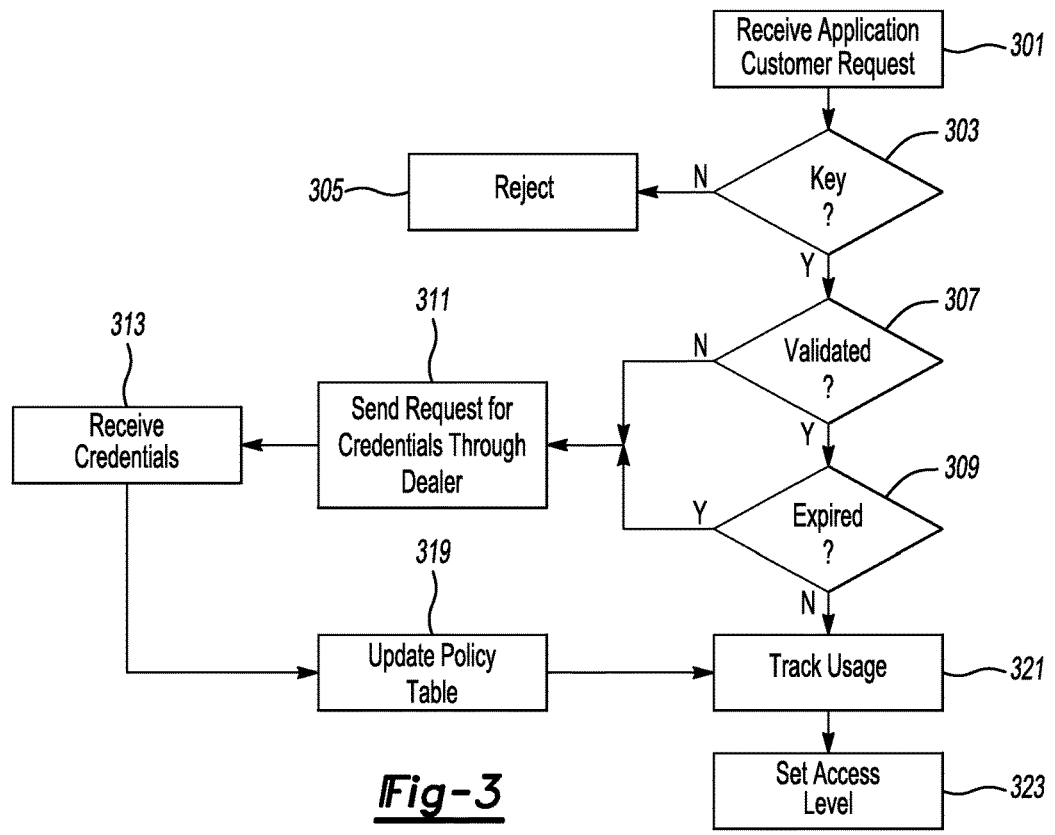
Fig-3
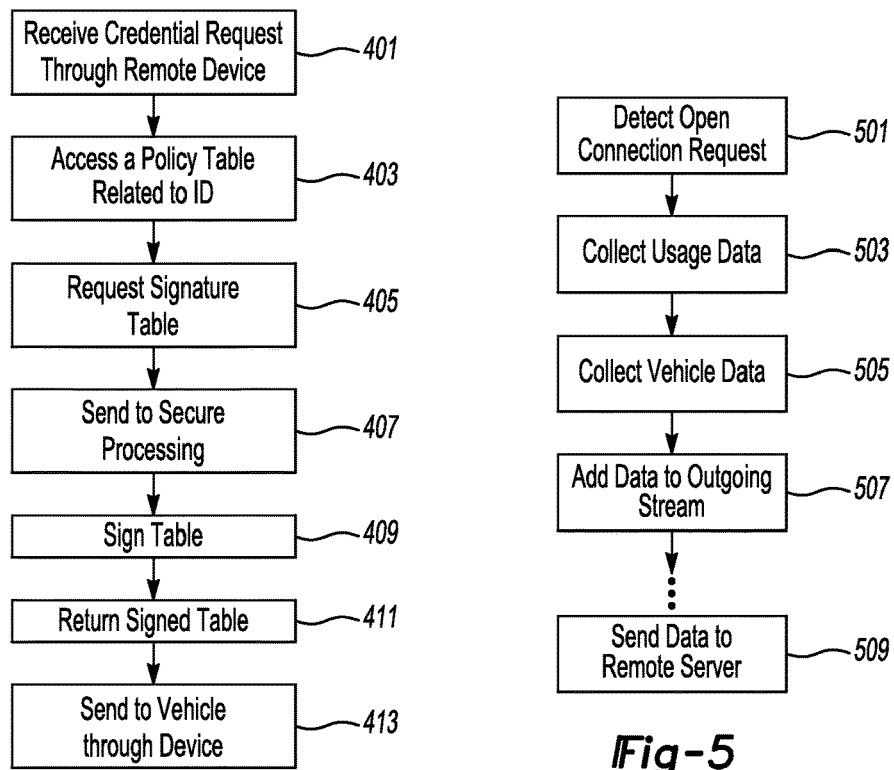
Fig-4
Fig-5

METHOD AND APPARATUS FOR REMOTE AUTHENTICATION

TECHNICAL FIELD

The illustrative embodiments generally relate to a method and apparatus for remote authentication.

BACKGROUND

Mobile computing platforms have made a steady rise in popularity over the last decade, providing users with the capacity to essentially use and access computing resources in almost any environment in which they find themselves. As these resources become more prevalent, they bring with them a new set of challenges to ensure that they are not improperly accessed or hijacked by malicious software products.

Before the advent of tablet PCs, smart phones and various other "portable" computing platforms, the only typical instance of mobile computing was laptop computers. Being smaller versions of desktop PCs, they emulated their progenitors in many ways. With regards to protection against impermissible access, they had dedicated security integrated with an operating system, and a user would typically be well aware of most of the software that was allowed to run on the machine.

Programs developed for these platforms was often robust, and took months and or years to develop. Most software products came from trusted sources, and, in a "worst case scenario" situation, even if the laptop was maliciously accessed, the damage to the user was limited. Data may be lost, but operating systems could be reloaded and drives formatted, and the laptop base platform could be restored to operating condition.

Mobile computing solutions present new opportunities for malicious access, however, and new security challenges for OEMs and developers. For example, if a person's smartphone is compromised, the owner may not only lose computing access to the phone, but may also lose the ability to use the device for its additional functionality, that of a phone. Other mobile computing platforms, such as, for example, vehicle computing systems like the FORD SYNC product, carry an even greater need for protection, as it is certainly desirable to prevent malicious access to a computing system that could affect or is connected to automotive control systems within a moving vehicle.

At the same time, easy to use and compact programming resources have become available for the writing of portable applications ("apps") for these devices. Often made publicly available from websites and platform accessible cloud based marketplaces, apps can be quickly and cheaply developed to allow users to perform a variety of tasks using mobile computing resources.

People wishing to control access are forced to strike a balance between limiting access to system resources in order to protect the system, which may cause fewer apps to be available and disappoint end-users, and providing higher levels of access, expanding the availability of apps at the potential cost of system security.

Partnerships with trusted developers can be used to solve some of these problems, but it may be possible to either "spoof" developer access and trick a system into believing that a program comes from a trusted developer, or to simply use commands that are released on a limited basis to developers. Since information tends to make its way into the public domain rather quickly, it may be difficult to control use of application programming interfaces ("APIs") that allow an app to interface with a computing platform, once the commands and arguments are released.

Also, many platform developers or providers don't want to have to involve themselves too deeply in playing "police" over the applications. It would be preferred to find a solution that allows access control in predefined confines and is relatively robust without over-consuming human resources in constant vetting and oversight of apps.

SUMMARY

In a first illustrative embodiment, a computer-implemented authentication method includes receiving a request to access one or more features of a vehicle computing system (VCS) from an application running on a wireless device in communication with the VCS. The illustrative method further includes preparing a secure access rights request to a remote server including one or more characteristics associated with the application and sending the secure request from the VCS, through the wireless device to the remote server.

In this embodiment, the illustrative method additionally includes receiving a response to the request having been sent from the remote server through the wireless device. The illustrative method includes verifying the authenticity of the received response and updating a policy table including information from the received response, the information including at least an expiration trigger and access rights for the application. Also, the illustrative method includes validating the application for usage based at least on the information included in the updated policy table.

In a second illustrative embodiment, a computer-implemented authentication method includes compiling a list of applications currently approved for use in conjunction with a vehicle computing system and transmitting the list to a remote server for processing. The illustrative method also includes receiving a processed response to the transmission.

In this embodiment, the illustrative method further includes determining one or more applications not authorized for use with the vehicle computing system based on the response and disabling the one or more applications not authorized for use.

In another illustrative embodiment, an authentication system includes a vehicle computing system operable to provide access to components thereof to one or more applications running on a device wirelessly connected thereto. The illustrative system further includes a remote authentication server in communication with the vehicle computing system through the device.

In this illustrative embodiment, upon receiving a request for system access or resource usage from an application, the vehicle computing system is operable to request authentication of the rights of the application from the remote server, the request including sending one or more application credentials to the remote server through the device on which the application is running.

Also, in this illustrative example, upon receiving the request from the vehicle computing system, the server is operable to determine access rights for the application and transmit a signed policy table in response to the request from the vehicle computing system, the policy table including access rights for the application and being transmitted through the device. Further, upon receipt of the policy table, the vehicle computing system is operable to authenticate the application based on information contained in the policy

BRIEF DESCRIPTION OF THE DRAWINGS

FIG. 3 shows an illustrative example of a validation process for an application;

FIG. 4 shows an illustrative example of a second validation process for an application;

FIG. 5 shows an illustrative example of piggybacking data with a validation request;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
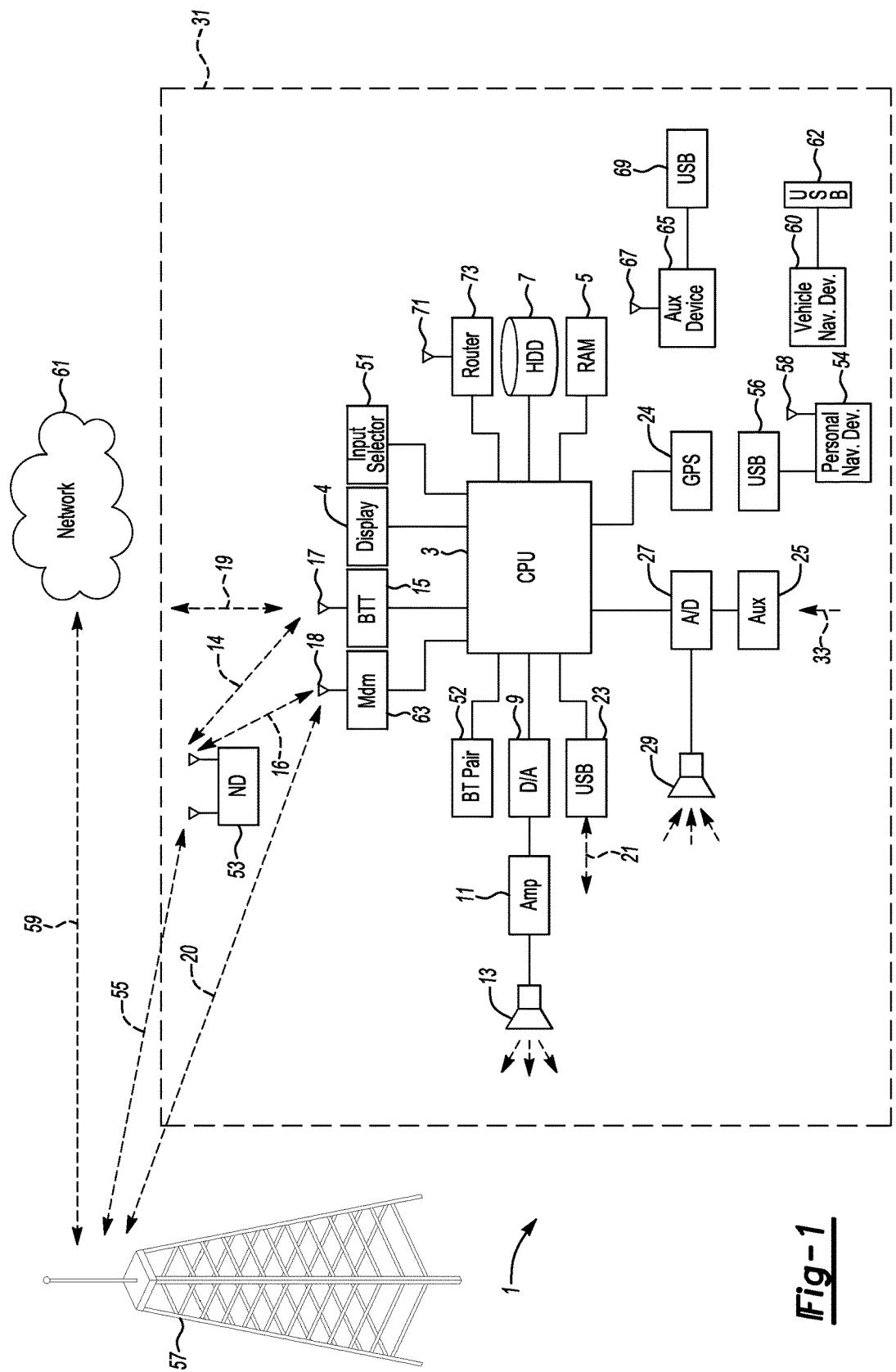
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In mobile computing platforms built around the model of or similar to the FORD SYNC system, a vehicle based computing system (VCS) communicates with a remote server through a wireless device. The wireless device may be provided by a vehicle occupant, and thus, although it acts as a conduit for information between the VCS and a remote server, it is largely out of the control of the vehicle manufacturer.

In other words, communication between two trusted endpoints (the VCS and a controlled server) may be established using an "untrusted" device. If an application is run from the device and access to the VCS is desired, authentication may be performed at the VCS or at the remote server. If authentication is performed at least in part remotely, another wrinkle is added to the trustworthiness of the system. Under this model, a potentially untrusted application is asking for access to a trusted system. In order to authenticate the application communication may need to be made through an untrusted device, also running the application, to a trusted source. The illustrative embodiments present non-limiting examples of solutions to this rather unique paradigm of authentication. The illustrative embodiments also have implementations designed to prevent replay attacks and man-in-the-middle (MIM) attacks.

Figure 2A:
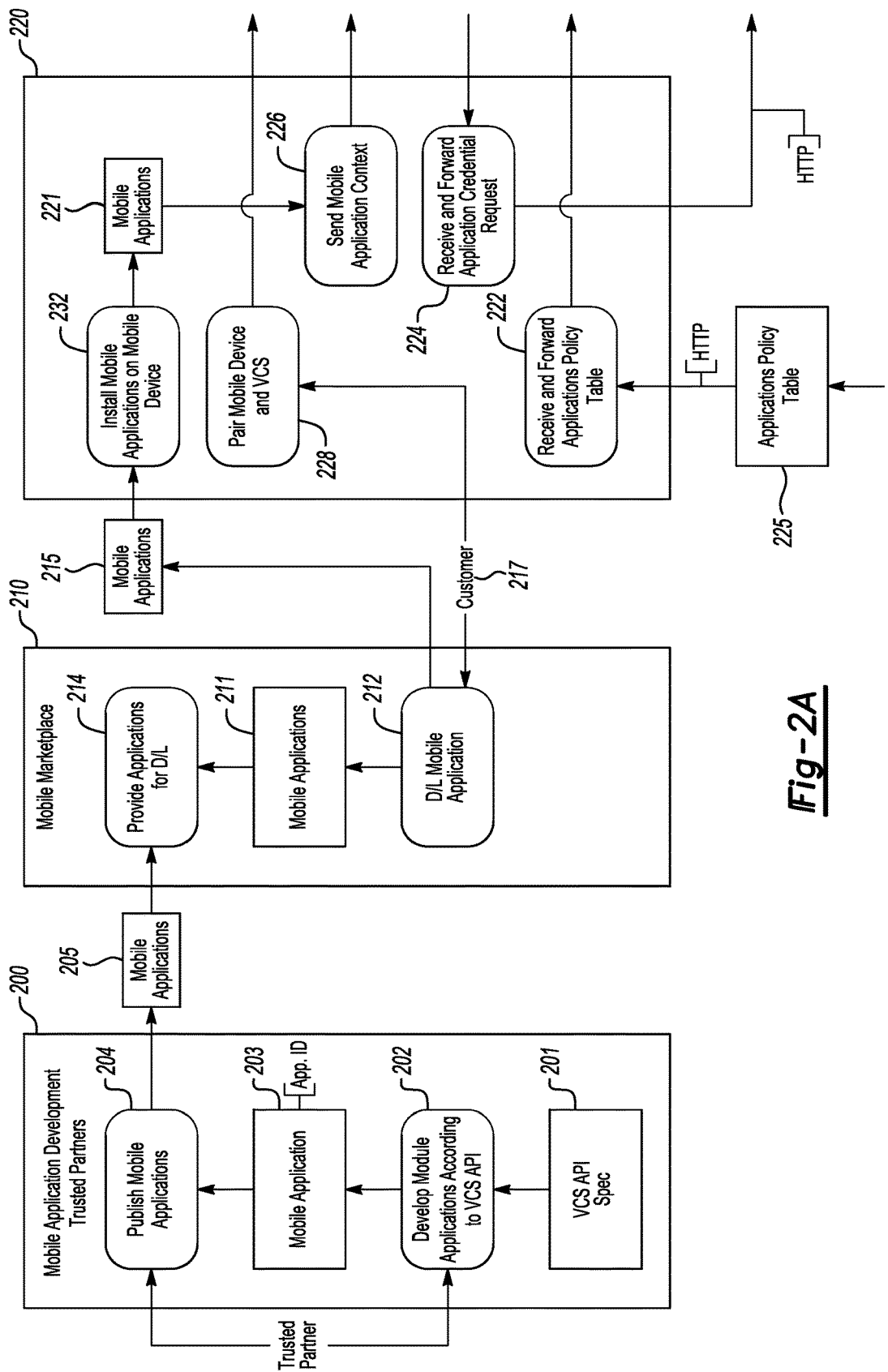
FIGS. 2A-2C show an illustrative example of an process flow between an OEM, a mobile platform, and a mobile application.
Figure 2B:
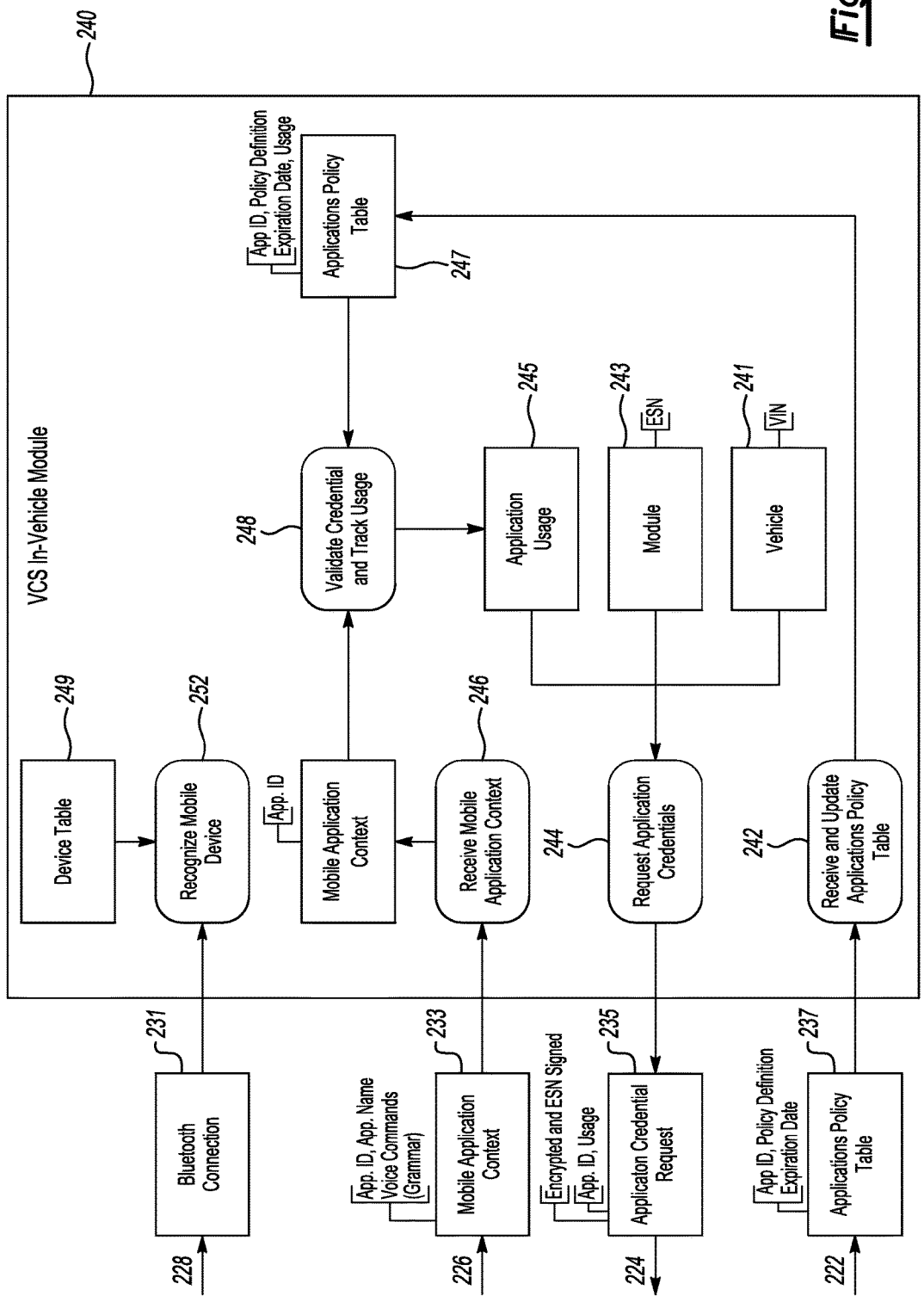
Figure 2C:
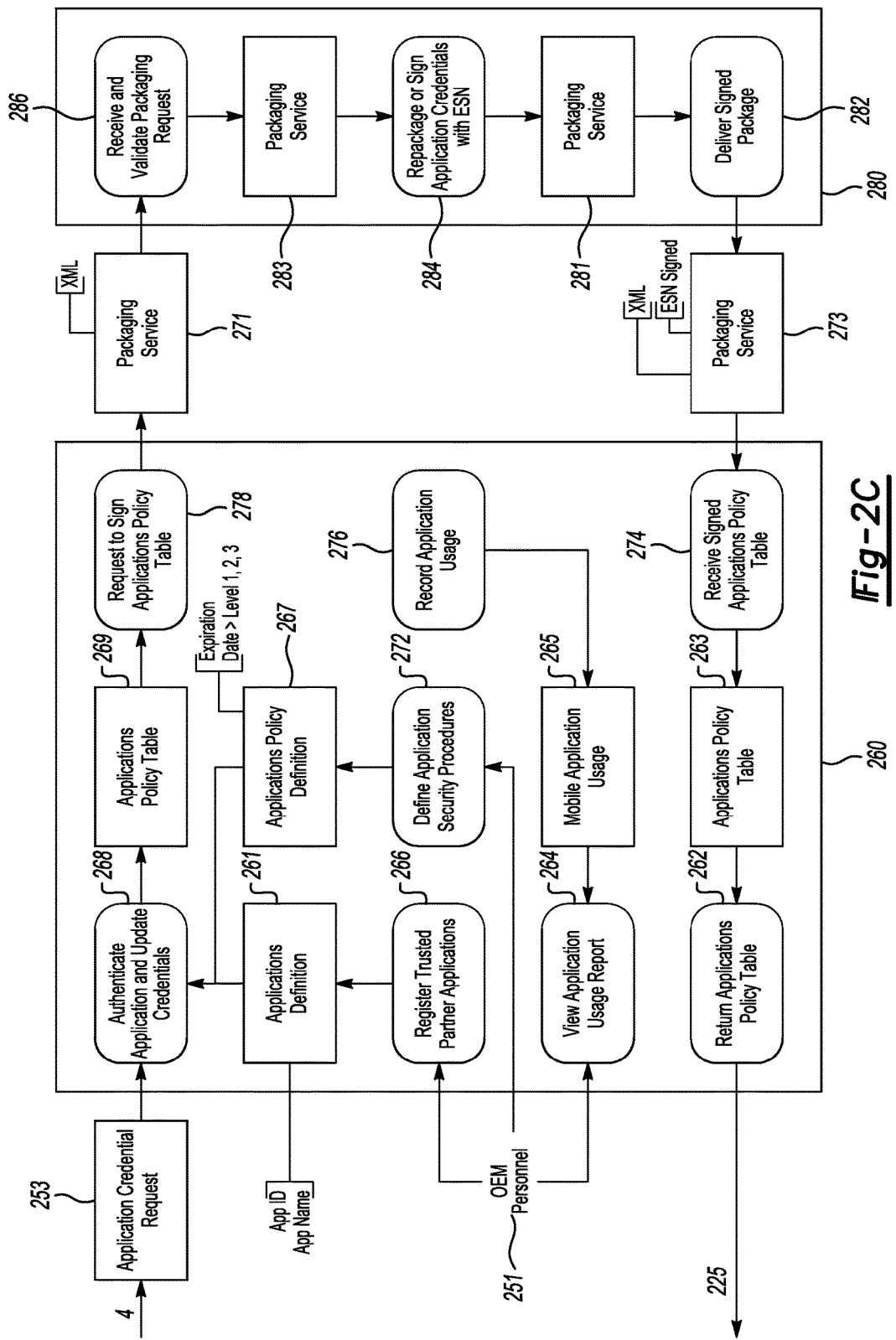

FIGS. 2A-2C show an illustrative example of an process flow between an OEM, a mobile platform, and a mobile application. Portions of this detailed figure will be discussed with respect to later figures, however this provides one illustrative, non-limiting comprehensive system under which the illustrative embodiments may be applicable.

Element 200 of FIG. 2A relates to mobile application developers in this model. In this example it is preferred that they are trusted partners, but presumably anyone with access to the API commands for interfacing with the VCS could be an application developer.

In this example, the developer is provided with a list of API commands 201. This could be a comprehensive list of commands, or could be limited based on access level rights or level of trustworthiness of a particular developer. For example, without limitation, a first set of commands could be provided for use by the general public (i.e., anyone who wishes to develop applications). A second set of additional or alternative commands could be provided to known developers who are under contractual obligation or who have been vetted for trustworthiness, and still another set of commands could be provided, for example, at a certain cost to an escalated tier of developers (this tiering can continue as needed). Further discussion of access rights can be found in co-pending application U.S. Pub. Ser. No. 12/788,797, filed May 27, 2010, the contents of which are incorporated herein by reference.

In one instance, the public may be given general rights to access, for example, display capabilities of a navigation display. With limited data transfer access, these capabilities could be used to write basic applications that transfer data from a remote source to a vehicle display.

A trusted tier of developers may also be given access to, for example, audio playback systems of a vehicle. Using these commands, music or other information could be played in audio form, and application commands, menus, prompts, etc could be output over an audio system.

A third tier of developers may be given even further access to the vehicle systems, being provided with capabilities to, for example, interrupt other applications or prioritize processing of system requests. By providing API access in a controlled fashion, some degree of control can be maintained over what features are accessed by particular apps (e.g., without limitation, vehicle bus, vehicle location, navigation integration, overriding driver distraction directives, etc.), and a measure of security can be obtained.

Using the API with which they are provided, developers can then develop applications for use on the VCS 202. These mobile applications 203, may also have additional information included with them, such as, but not limited to, an application ID. Once completed, the applications may be published for inclusion in a mobile marketplace 204.

The mobile applications 205 may then be sent to or made available on a mobile marketplace 210. The marketplace may provide a list of mobile applications for download 214, and selection of a particular mobile application 211 may cause the application to be downloaded from the marketplace 212 to a mobile device 220. Download of the application may also result in installation of the application as usable application 232 on the mobile device.

In addition from sending the mobile application 215 from the marketplace to the mobile device, communication may also flow from the mobile device in the form of customer requests 217 for particular applications. In at least one model, applications are only downloaded as a result of customer requests, thus providing at least a basic level of security with regards to the selection of applications for execution on the mobile device.

As well as communicating with the mobile marketplace, the mobile device 220 may also communicate with a vehicle computing system 240. Through an established connection between a device paired with a VCS, mobile apps can be run on the mobile device and interface with the vehicle computing system. It may be possible, in some instances, that the applications are also transferred to the VCS for execution.

Connection and pairing of the device may be done over a BLUETOOTH connection 231 or other suitable wireless or wired transfer protocol (such as, but not limited to, Apple iAP, WiFi, etc.). The device may then be recognized by the VCS 252, by use of, for example, without limitation, a table of known devices 249. Additionally or alternatively, an application may "live" in the cloud, and the device can function as a pass-through only.

Once a particular mobile application has been downloaded, it may be executed 221 and, to some extent, attempt to interface with the VCS. Such a request may cause a context transfer between the device and the VCS 226, for use in such processes as application authentication.

In this example, the mobile application context 233 may contain an app ID, an app name, and application grammar. Other useful information may also be included. In this example, the application may both be authenticated to run in general, and, in particular, to use specific elements of grammar (commands to the VCS, etc.).

The VCS may receive the context from the mobile device 246 and attempt to validate the application's credentials 248. In addition to validating the application's credentials, the VCS may additionally track usage of the application, to provide feedback to both application developers and to vehicle manufacturers.

Information relating to application authentication may be stored in an application policy table 247, which may include information such as, but not limited to, app IDs, policy definitions, expiration triggers and usage statistics. At least some of the information in the policy table may be filled from a remote source, as will be discussed later with respect to an authentication request.

If an application is not immediately authenticatable based on policy table information, or if further authentication is desired, application usage information 245, vehicle module information 243 and vehicle information 241 may be sent in conjunction with a request for application credentials 244.

The application credential request 235 may include an app ID and usage data, and may further be encrypted and signed with an ESN of a vehicle module, so as to prevent hijacking or impermissible access to the request as it is passed through the "untrusted" mobile device.

The mobile device may then receive the credential request 224 and forward the request to a remote server for processing. Since the VCS communicates to the remote server through the wireless device, it may be common for the secure request to pass through the relatively unsecured mobile device in order to be authenticated and returned.

Having been forwarded by the mobile device, the application credential request 253 may arrive at a secure server 260. The request is decrypted and the application is then processed for authentication and credential update 268. Even if an application has been previously authenticated, it may be reasonable to periodically re-authenticate the application to see if such features as, for example, without limitation, policy definitions, access rights, expiration triggers and application versions have changed.

OEM personnel 251 who work out rights definitions may provide registration of trusted partner application 266. They may also provide definitions of application security procedures 272. This data 261, 267 may be used in conjunction with an application authentication request so that an application's authentication corresponds to the most recent versions of allowable policy and agreements with a particular vendor/distributor.

OEM personnel may also view application usage reports 264 relating to mobile application usage data 265 (or other useful data) recorded by the remote server 276 and included in conjunction with application authentication requests.

The request to authenticate the application may result in access of an applications policy table 269, and a request to sign the applications policy table with respect to the requesting application 278. Data relating to the application and policy table 271 may be securely sent to a security processing site 280, where the authentication and signature request may be received and validated 286.

At the secure processing point of the process, the application credentials may be signed with, for example, an ESN, and repackaged for delivery to the authentication process 282.

The authentication process may then receive a signed applications policy table 263 that provides the authentication and access rights of the requesting application 274. This applications policy table may then be returned to the VCS for use in authenticating the application 262.

Because the remote server communicates with the VCS through the unsecured wireless device, the signed applications policy table may again be relayed through a possible point of untrustworthiness (and exposed to replay and/or MIM attacks, for example). Since the policy table has been signed, however, it should be relatively difficult for a malicious application to intercept the transfer and alter application rights on the table. The wireless device will relay 222 the application policy table 225 to the VCS for further processing.

At this point, the VCS can receive the applications policy table 237 from the wireless device and update a local version of the applications policy table using the signed table transferred from the remote server 242. This table can then be used to authenticate the particular application and allow it access according to the server defined policies.

Since it may be possible to "spoof" a message from the VCS to the server, and/or vice versa, it may be desirable to add a layer of additional security to prevent this. One possible implementation includes adding a message ID that is increased sequentially each time a new message is sent. If the message ID does not correspond with an expected ID number, the message may be disregarded as a fake. Other suitable security measures are also contemplated.

FIG. 3 shows an illustrative example of a validation process for an application. In this illustrative embodiment, a vehicle computing system may receive a request to validate or allow access to an application 301. The application may be, for example, an application running on a mobile wireless device in communication with the VCS, and may be requesting use of one or more features of the VCS or other vehicle system.

In this illustrative example, the vehicle OEM has worked in conjunction with an application developer to provide an application key relating to a specific application. In one example, the application has a key associated therewith, that is supplied to the VCS when the application is downloaded to the mobile device. If the key is not present when the application presents an access request 303, the application is rejected as being an application not having a key associated therewith. Additionally or alternatively, a search could be made for a key relating to the application based on existing credentials, or the VCS could request download of a key that may be stored on a wireless device and have not yet been provided to the VCS.

If the application key is present, the system may then attempt to validate the application 307. This can be done, for example, by comparing some aspect of the application, such as an app ID, to an existing policy table to see if the application was approved for the requested use on the VCS. Other suitable validation processes may also be applied.

If the application is validated, a second check may be performed to see if the application validation has expired 309. Since usage rights may have an expiration trigger, or because, for example, the OEM may wish periodically re-validate applications, expiration triggers may be assigned to authentication rights in a policy table to ensure that an app is at least periodically evaluated for access privileges.

If the application is valid and non-expired, the system may attempt to track the usage of the application 321, and may assign a particular access level for the application that may permit it to use or restrict it from using certain commands 323.

If the application cannot be validated, or if the application validation has expired, the process may send a request for application credentials through the wireless device 311. Once the request has been fulfilled by a remote authentication source, the VCS may receive the updated credentials 313 and then proceed with authentication and usage tracking.

FIG. 4 shows an illustrative example of a second validation process for an application. In this illustrative example, a remote server receives a validation requests having been forwarded through a wireless device in communication with a vehicle computing system 401.

The remote server then uses one or more identifying features of the request, and accesses a policy table to find information related to the requesting application 403. Once policy information is obtained and or updated, the process requests a signature of the policy table 405. The signature can help assure that the particular policy table originated from the remote authentication server and not an intermediary source attempting to spoof authentication.

In response to the signature request, secure processing is performed on the policy table 407 and the table is signed 409 and returned to the main authentication process 411. The signed table is then returned to the requesting vehicle computing system through the wireless device 413. In this manner, the remote server can securely process and return a securely signed table to a trusted endpoint through a relay that may not have as strict security protocol associated therewith.

FIG. 5 shows an illustrative example of piggybacking data with a validation request. In this illustrative example, data relating to application usage, or even vehicle system data can be sent in conjunction with an authentication request. In at least one model of a communication system, a vehicle computing system communicates with a remote server using a data over voice connection. Since this communication can potentially use wireless device minutes (which may be limited), it may be desirable only to establish communication when specifically authorized by a customer.

If the process detects that a data communication request is pending or open 501, usage data relating to applications may be compiled or collected 503. Additional data relating to, for example without limitation, vehicle systems or system usage could also be collected and compiled 505, along with any other desired data. The data is then added to an outgoing data stream already requested for sending over the established/requested connection 507 and is sent to a remote server for reception and processing.

Figure 6:
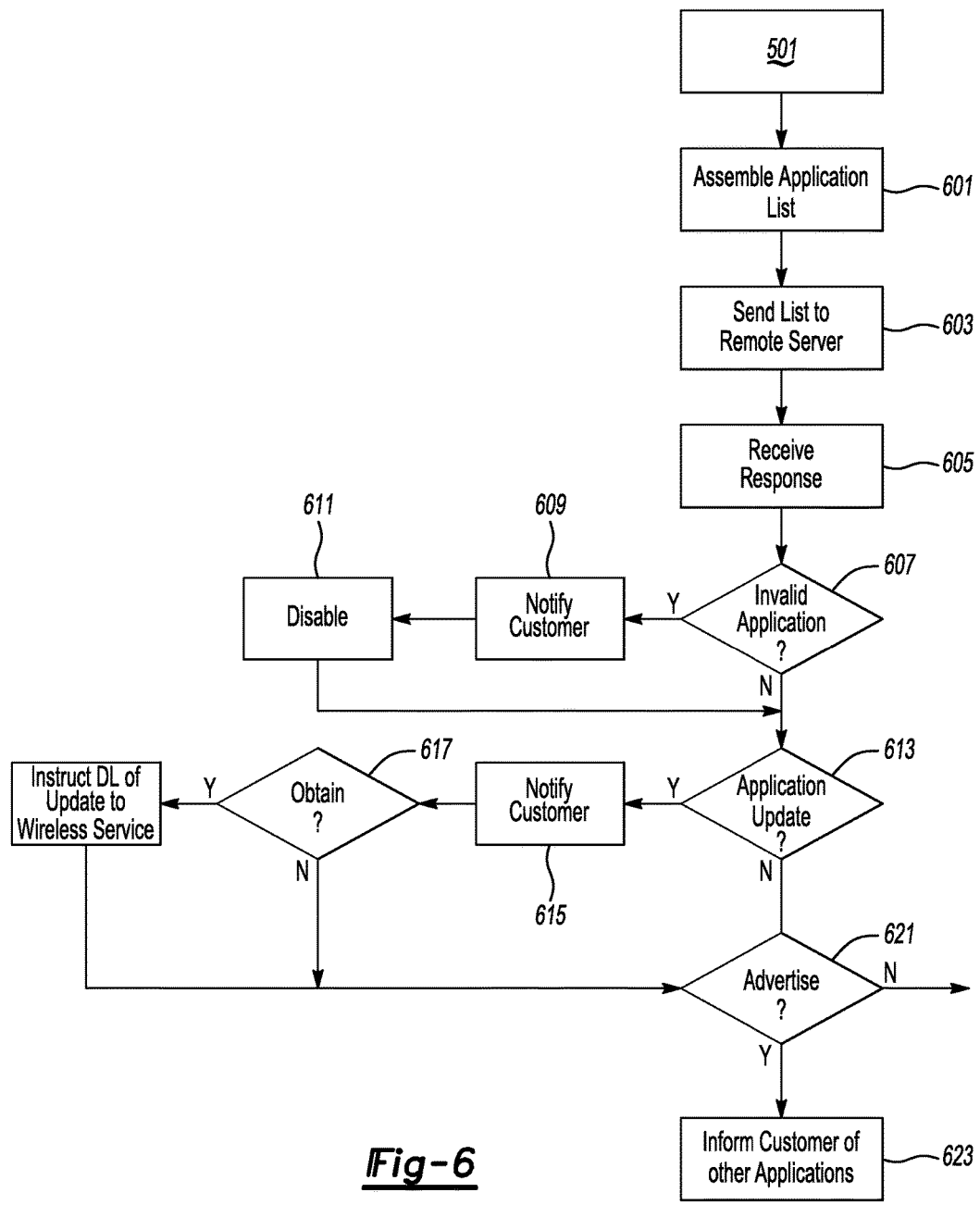
FIG. 6 shows an illustrative example of an application update process.

FIG. 6 shows an illustrative example of an application update process. In this illustrative embodiment, information relating to existing applications is sent to a remote server for processing. After an open connection or an open connection request 501 is detected, a list of existing applications is assembled and sent to a remote server 603. This list can contain information such as, but not limited to, version numbers, expiration triggers access rights, etc. The server can use this information to determine, for example, if any invalid applications are present in the authentication list, or if new versions of existing applications are available. By periodically checking the versions and access rights of all applications, updated and compatible application versions can be maintained, and outdated or impermissible applications can be removed.

Once a response is received from the server, it is determined if any applications are "invalid." Applications can be invalid due to a variety of reasons including, but not limited to, expiration, invalid version, known incompatibility, etc. The customer/occupant may be notified of any invalid applications 609, and the invalid applications may be disabled 611 to preserve the integrity of the VCS.

In addition to detecting invalid applications, this process may return information that one or more applications have updated versions available. If an app has an updated version available 613, the customer/occupant is notified by the process 615. If the customer desires to obtain the updated version 615 (or if updating is mandated by the rules of the system), the wireless device may be instructed to download the updated version of the application 619.

Finally, in this process, one or more advertisements related to existing applications may be provided 621. These could be provided 623 to inform customers of alternatives to existing applications, or application that work well, for example, in conjunction with existing applications or compliment those applications.

Figure 7:
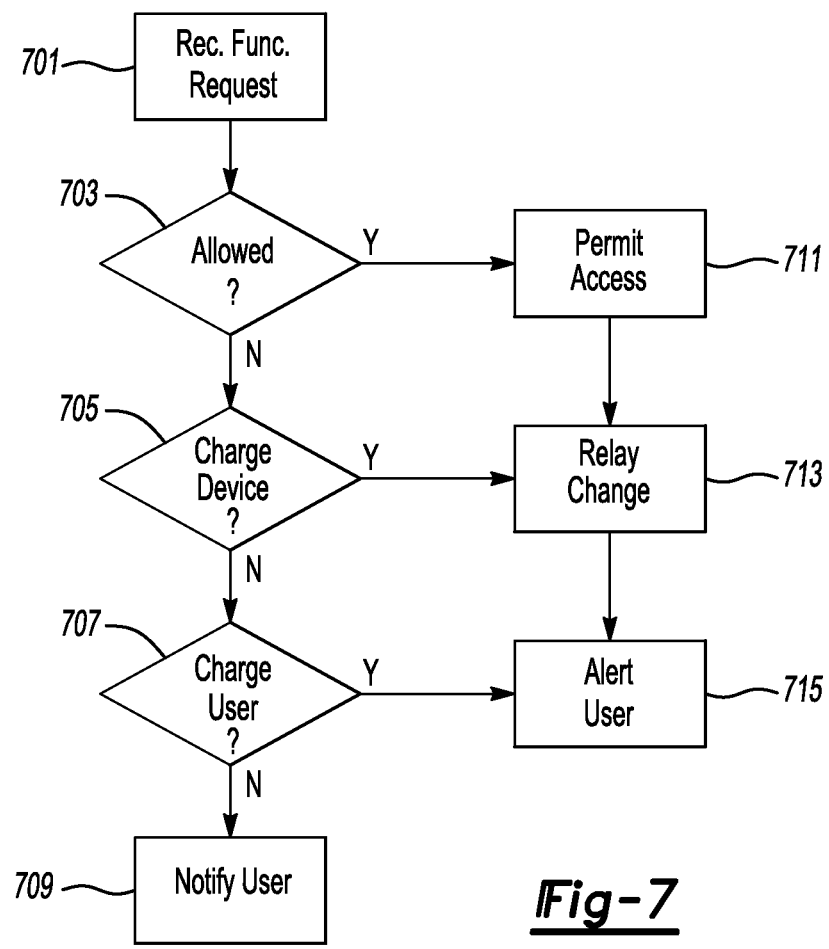
FIG. 7 shows an illustrative example of a further authentication process.

FIG. 7 shows an illustrative example of a further authentication process. In this illustrative example, an application may have a function or API call included therewith that the application developer has not been approved to use. In certain circumstances, however, command/system usage may be available on a per/use cost basis.

In this particular embodiment, the process receives an API command request from an existing application 701. The process checks to see if the application is allowed to access that API command or system 703, and, if so, processes the request 711.

If the requesting app does not have rights to access the particular command or system, the process may determine if a developer has an agreement that allows them to access the requested feature on, for example, a charge basis 705. If so, the charge may be relayed to a remote server for processing 713 and access to the feature may be granted.

If there is no predefined right for the developer to use the feature, it may also be possible that a user can use the feature on a charge/basis when executed by a particular app 707. If this is the case, the user may be alerted that a charge will be associated with the requested feature 715 and then the charge will be processed if the user agrees.

If there is no provision for developer/user charging, then the user is notified that the application is attempting to access a feature to which it does not have rights 709 and the process may exit.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented authentication method comprising:
    compiling, at a vehicle, a list of applications having current vehicle-stored approval for use on a vehicle computing system (VCS);
    transmitting the list from the vehicle to a remote server;
    receiving a response from the remote server indicating authorization status of applications on the list;
    determining an application on the list not authorized for use with the VCS based on the response; and
    preventing resource access by the determined application.

2. The method of claim 1, wherein the preventing includes removing a stored approval-status for the application.

3. The method of claim 1, wherein the application not authorized for use based on the response is installed on the VCS and the preventing includes removing the application.

4. The method of claim 1, wherein the response includes information relating to a new version of an application, and wherein the method further includes updating the application indicated by the information as having a new version.

5. The method of claim 1, wherein the list of applications comprises applications currently installed on the vehicle computing system.

6. The method of claim 1, further comprising notifying a user if an application is prevented from accessing resources.

\* \* \* \* \*